March 22, 1955 G. L. FERNSLER 2,704,816
ELECTRON BEAM DEFLECTION FIELD CONTROLLING APPARATUS
Filed July 24, 1952 2 Sheets-Sheet 2
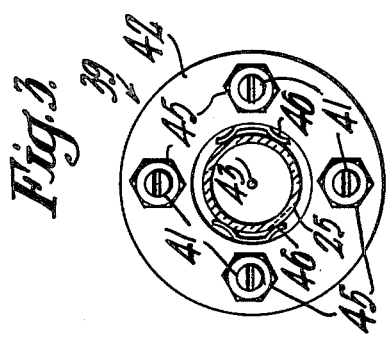
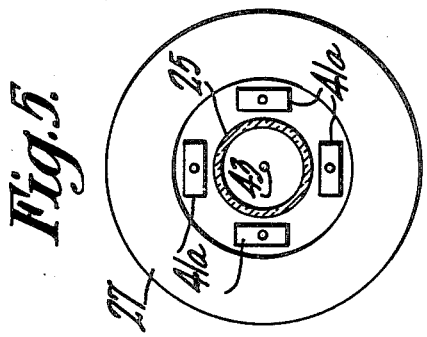
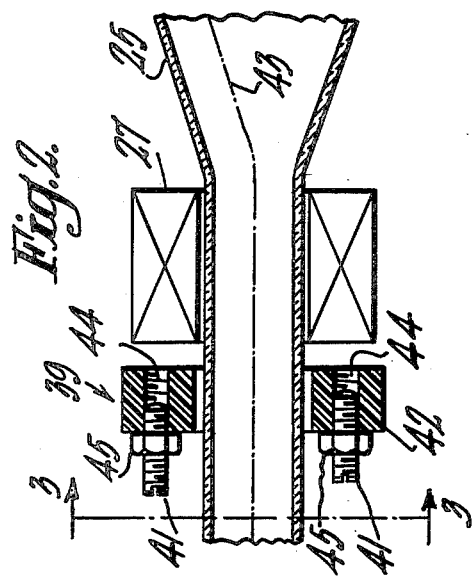
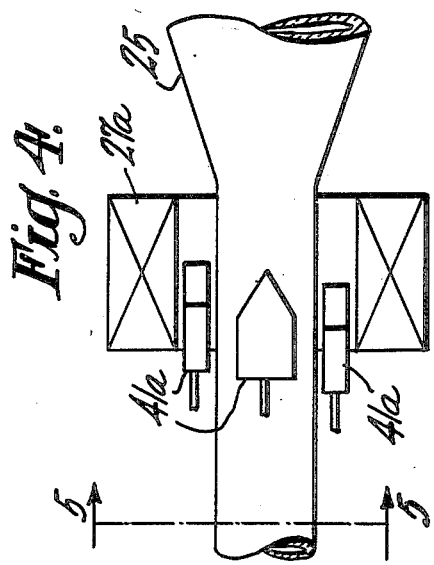
INVENTOR.
George L. Fernsler
BY
ATTORNEY

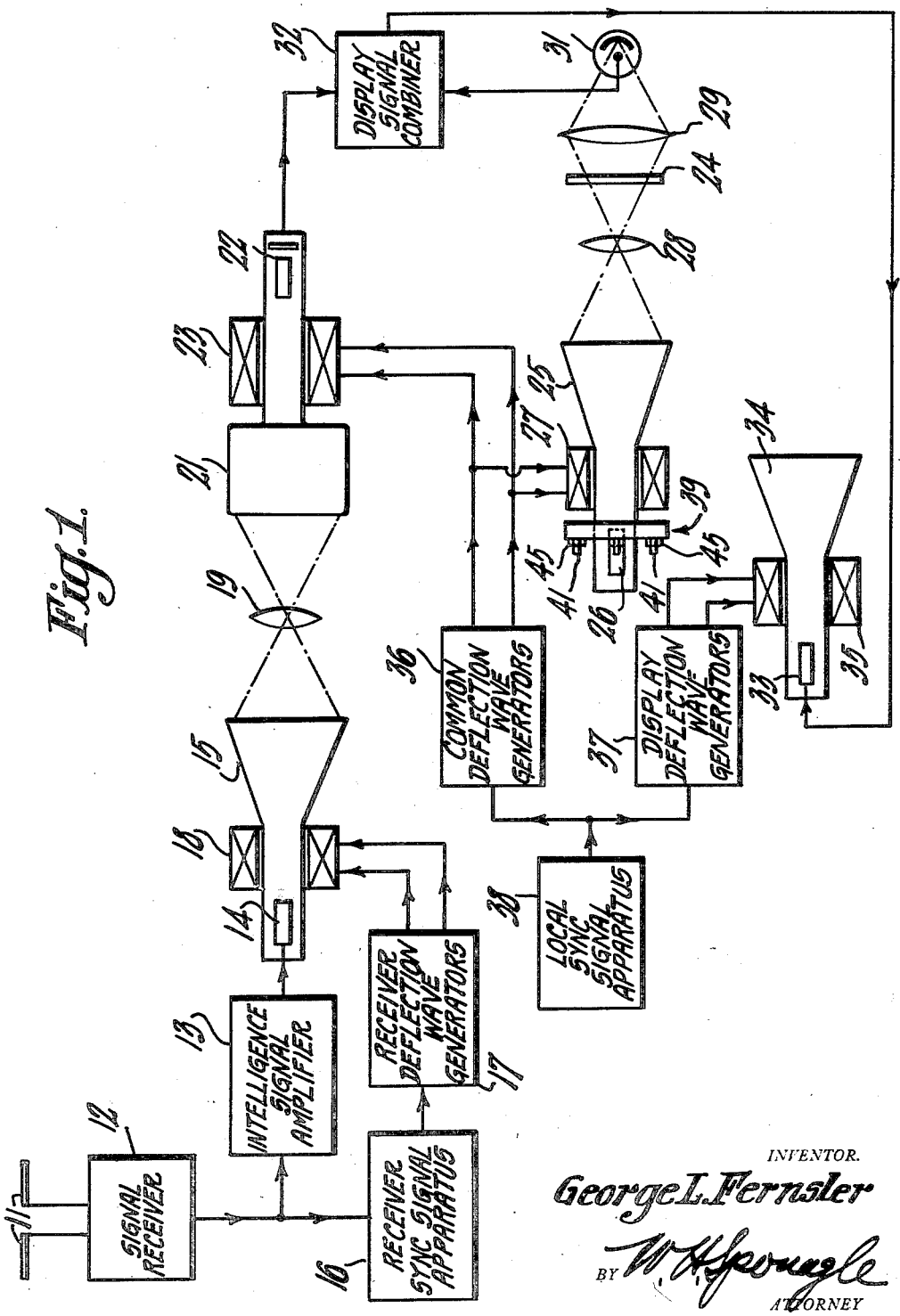

United States Patent Office 2,704,816
Patented Mar. 22, 1955

2,704,816

ELECTRON BEAM DEFLECTION FIELD CONTROLLING APPARATUS

George L. Fernsler, Pennington, N. J., assignor to Radio Corporation of America, a corporation of Delaware Application July 24, 1952, Serial No. 300,613

16 Claims. (Cl. 313—76)

This invention relates to electron beam deflection systems and particularly to apparatus by which to selectively control the flux distribution of an electromagnetic beam deflecting field.

It frequently is necessary to control the flux distribution of an electron beam deflection field in order to provide a desired shape to the raster scanned by an electron beam subjected to the influence of such a field. It is difficult in quantity production to make the deflection apparatus, such as the yokes and energizing circuits therefor, so as to effect the scansion of the same size and shape of raster in all cases. Such a difficulty is particularly experienced where it is desired to combine the video signals representative of two or more subjects so as to produce a composite display. In such a situation, it is necessary for accurate reproduction of the plurality of images to effect substantial identity in the registration of the scanned rasters.

One example of a system in which such a difficulty is experienced is where, in color television, it is desired to superimpose a plurality of component color images derived from a plurality of image-reproducing devices. Another typical system in which the described registration difficulty arises is where it is desired to display certain navigation information, such as the location of objects, in a superposed relationship to a map, for example. In such a case, the signals representing the navigation information and those representing the may may be separately derived from different electronic signal-generating apparatus.

Therefore, it is an object of the present invention to provide an improved field distribution control apparatus whereby to accurately produce a desired raster by means of an electron beam subjected to the influence of such a deflection field.

Another object of the invention is to provide an improved deflection field distribution control apparatus by which to accurately produce a desired raster and which is not only simple structurally, but also is comparatively easy to adjust.

In accordance with the present invention, there is provided an electron beam deflection system including an electromagnetic yoke mounted adjacent to the path of the beam to be deflected thereby and energizable to deflect the beam so as to scan a raster, and a field-controlling magnetic shunt mounted adjacent to the beam-entrance end of the beam deflection yoke. In accordance with one of the features of the invention, the magnetic shunt includes a plurality of relatively high permeability magnetic shunting members which are circumferentially spaced about the beam path in such a manner as to be adjustably positionable for the purpose of selectively controlling the field produced by the deflection yoke.

The novel features that are considered characteristic of this invention are set forth with particularity in the appended claims. The invention itself, however, both as to its organization and method of operation, as well as additional objects and advantages thereof, will best be understood from the following description when read in conjunction with the accompanying drawings.

In the drawings:

Figure 1 is essentially a block diagram of a representative type of signalling system in which the invention may be embodied;

Figure 2 is a side elevational view, partly in cross section, of an electron beam deflection yoke and one form of a magnetic shunt in accordance with the invention;

Figure 3 is an end view of the apparatus embodying the invention taken on the line 3—3 of Figure 2;

Figure 4 is a side elevational view of another form of the invention; and

Figure 5 is an end view of this other form of apparatus taken on the line 5—5 of Figure 4.

For a description of a representative form of system in which the present invention may be embodied, reference first will be made to Figure 1 of the drawings. In this case, it is assumed that the system is for the purpose of making a common superimposed display of certain intelligence signals which, for example, may represent navigation data upon a subject, such as a map. In the assumed case, the navigation information representing a received intelligence signal may be derived from apparatus similar to radar equipment. In such a case, the signals are intercepted by an antenna 11 which is coupled to a suitable signal receiver 12. This receiver may be somewhat equivalent to television receiver apparatus in which case it will be understood to include radio and intermediate frequency amplifiers, a signal converter and a carrier wave demodulator or signal detector. In any case, it will be assumed that the signals derived from the receiver 12 are composite signals including both intelligence and deflection synchronizing signals. The intelligence signals are impressed upon an intelligence signal amplifier 13 which may, for example, be equivalent to a conventional television video signal amplifier. The intelligence signals derived from the amplifier 13 are impressed upon the electron beam intensity-controlling apparatus, such as an electron gun 14, of a cathode ray image-reproducing device, such as a receiver kinescope 15.

The composite signals derived from the receiver 12 also are impressed upon the sync signal apparatus 16 and which functions to separate the sync signals from the intelligence signals. The separated sync signals are impressed upon the receiver deflection wave generator 17. This apparatus may be synchronized by the sync signals substantially in the usual manner. It will be understood that the deflection pattern for the electron beam derived from the gun 14 of the receiver kinescope 15 will depend upon the type of signal-receiving equipment which is employed. For example, the electron beam may be deflected both horizontally and vertically to scan the substantially rectangular raster in a manner similar to that employed in conventional television receiver apparatus. On the other hand, the electron beam may be deflected in a manner similar to that employed in the Plan Position Indicating type of radar apparatus. Accordingly, it will be understood that the deflection waves produced by the generator 17 will be suitable to effect the desired type of electron beam deflection. So far as the present invention is concerned, the type of electron beam deflection which is employed to effect an image reproduction on the luminescent screen of the receiver kinescope 15 is immaterial and forms no part of the present invention. Accordingly, it will be understood that suitable deflection waves are impressed upon a deflection yoke 18 to effect the desired beam deflection.

The optical reproduction of the received intelligence signals which is effected on the luminescent screen of the receiver kinescope 15 is projected by suitable optical apparatus represented by a lens 19 upon the photosensitive electrode of a signal-generating camera tube 21 of a conventional type. The camera tube 21 may be of the same general type as that disclosed in a paper by A. Rose, P. K. Weimer and H. B. Law titled "The Image Orthicon—A Sensitive Television Pick-Up Tube," published in the Proceedings of the IRE, vol. 34, July 1946, at page 424. Such a camera tube is provided with an electron gun 22 from which to derive a scanning beam which, when deflected by means of a deflection yoke 23 over a target electrode, effects the generation of video signals representative of the image derived from the receiver kinescope 15.

The present illustrative system also includes signal-generating apparatus of the flying spot scanning type for producing video signals representative of a subject, such as a map in the form of a light transparency 24. The flying spot scanning apparatus includes a kinescope 25 as the source of the flying spot of light. The kinescope is provided with an electron gun 26 which produces a constant intensity electron beam which is deflected by means including a deflection yoke 27 to scan a raster at a luminescent screen. The optical image of the flying spot of light produced at the kinescope screen is projected by an optical system represented by a lens 28 through the transparency 24 and is directed by suitable optical apparatus such as a condensing lens 29 onto the photo-sensitive cathode of a photo tube 31.

The video signals derived from the output of the camera tube 21 and those derived from the output of the photo tube 31 are impressed upon respective input circuits of a display signal combiner 32. The signal-combiner may be conventional apparatus by means of which the two groups of video signals may be added so as to form a composite video signal which is representative of both the subject matter reproduced on the screen of the receiver kinescope 15 and that represented by the transparency 24.

The composite video signal derived from the output of the signal combiner 32 is impressed upon the electron beam intensity controlling apparatus, such as an electron gun 33, of another image reproducing apparatus such as a display kinescope 34. The electron beam produced by the gun 33 is deflected under the control of a deflection yoke 35 to scan a raster at the luminescent screen of the kinescope 34 so as to reproduce a composite image representing the superposition of the received intelligence signal upon a subject such as a map.

The deflection of the respective electron beams in the camera tube 21 and the flying spot kinescope 25 may be effected by energizing the deflection yokes 23 and 27, respectively, by suitable connections to common deflection wave generators 36. In this way, there are no synchronizing problems with respect to the two video signal-generating devices, and since all of this apparatus may be somewhat closely grouped, it ordinarily will be a particularly convenient arrangement, especially where the registration of the superimposed images is desired to be as accurate as possible. Deflection of the electron beam in the display kinescope 34 may be effected by energizing the deflection yoke 35 from display deflection wave generators 37. The deflection wave generators 36 and 37 are maintained in synchronism by signals derived from local sync signal apparatus 38.

However, even in such a case, because of the difficulties in the manufacture of deflection yokes and also because of some dissimilarities of the operating characteristics of the various cathode ray devices employed, it is not usually possible to secure the desired high degree of accuracy in the registration of these images without the use of additional facilities. According to the present invention, therefore, one or both of the two signal-generating devices is provided with an additional facility for more accurately controlling the flux distribution of the electron beam deflection field so as to make it correspond substantially with the deflection field of the other apparatus. Accordingly, the flying spot kinescope 25 is provided with a magnetic shunt 39 mounted adjacent to the beam-entrance end of the yoke 27. The shunt, which will be described in greater detail subsequently, comprises a plurality of high permeability magnetic shunting members, such as 41, which in the illustrated form of the invention may be mounted in a support 42 which is of nonmagnetic material, preferably an insulator. By suitably adjusting the shunting members 41 in a manner to be more fully described subsequently, the flux distribution of the electron beam deflection field produced by the yoke 27 may be so controlled that it effects substantially the same deflection of the electron beam derived from the gun 26 of the flying spot kinescope 25 as that effected by the yoke 23 of the electron beam derived from the gun 22 of the camera tube 21. Accordingly, the composite signals derived from the combination of those produced by the camera tube 21 and the photo tube 31 are developed in such a manner as to effect substantially the desired highly accurate registration of the two superimposed images produced by the display kinescope 34.

Reference next will be made to Figures 2 and 3 of the drawings for a description of one form of apparatus embodying the invention. The magnetic shunt 39 is mounted adjacent to the end of the deflection yoke 27 at which an electron beam 43 enters substantially on a central axis of the kinescope 25. This end of the yoke is referred to in the specification and in the claims as the beam-entrance end of the yoke. The other end of the yoke which is termed the beam-exit end is that from which the deflected electron beam 43a emerges substantially in the usual manner. In this form of the invention, the insulating support 42 is provided with a plurality of holes such as 44 so as to receive the high permeability magnetic shunting members 41. As shown, the holes 44 are internally threaded so as to receive the substantially cylindrical externally threaded shunting members 41. These shunting members may be made of relatively high permeability materials such as powdered iron, ferrite and the like. In the presently illustrated form, they may be somewhat similar to the adjustable cores commonly used for transformers in radio and television amplifiers, for example. It is seen that, by reason of the described construction of the magnetic shunt 39, the shunting members 41 may be individually adjusted in their spacing relative to the beam-entrance end of the yoke 27. They may be secured in their adjusted positions by suitable clamping means such as lock-nuts 45. In effect, these members function by diverting some of the flux generated by the yoke 27. The flux diversion is limited in extent to the comparatively small region of each of the shunting members 41. The extent of the shunting effect is dependent upon the spacing between the individual shunting members and the beam-entrance end of the yoke. The closer the spacing, the greater will be the flux diversion or shunting.

The magnetic shunt 39 may be provided with a plurality of mounting springs 46 adjacent to the insulating support 42 so as to mount the structure directly upon the neck of the kinescope 25. Accordingly, in this manner it may be seen that the entire magnetic shunting structure may be adjusted circumferentially about the path of the electron beam 43. This adjustment is in addition to that previously described with reference to the individual shunting members 41. Accordingly, it is seen that, not only may the shape of the scanned raster be controlled by suitable manipulation of the spacing of the individual shunting members 41 relative to the yoke 27, but also the orientation of the entire raster may be adjusted by a suitable manipulation of the structure circumferentially about the beam path.

It is to be understood that the greater the number of the individual shunting members 41 that is provided in such apparatus, the more accurately the field flux distribution may be controlled and consequently, the higher the degree of accuracy that may be achieved in the registration of the plurality of superimposed images. Therefore, the invention is not to be limited to the number of shunting members shown, but is to be considered as including greater or lesser numbers, as required. Furthermore, it is to be understood that the adjustable positioning of the individual shunting members 41 in spacing relative to the beam-entrance end of the yoke 27 need not be limited to the threaded structure shown. Alternatively, the shunting members may be frictionally engaged with the holes 44 and the spacing adjustment may be effected by a relative sliding movement. It also is to be understood that the cross sectional form of the shunting members may either be uniform as shown in Figures 2 and 3 or non-uniform, as desired.

Another form of the invention is shown in Figures 4 and 5 to which reference now will be made. In this case, the deflection yoke 27a is substantially similar to the form previously described with reference to Figures 2 and 3 except that its internal diameter is made great enough to receive a plurality of magnetic shunting members 41a between it and the neck of the kinescope 25. In this form of the invention the shunting members 41a are made relatively flat so that they may be inserted substantially as shown and described. The thickness should be no greater than that required to effect the desired shunting of the field flux produced by the yoke, in order to minimize the internal diameter of the yoke and thereby maintain a comparatively high degree of deflection efficiency. The shunting members 41a may be inserted directly between the kinescope neck and the inside of the yoke substantially in the manner shown. Alternatively, they may be mounted in a suitable supporting structure positioned at the rear of the yoke substantially in the manner shown in Figure 2.

Another feature of the form of the invention shown in Figure 4 is that the magnetic shunting members 41a are tapered so as to provide a somewhat finer degree of control of the field flux. In this form of the invention the flux-diverting effect of the magnetic shunting members 41a is somewhat greater than in the form of the invention previously described with reference to Figures 2 and 3. This greater effect is achieved by reason of the closer positioning of the shunting members to the effective region of yoke 27a. The arrangement is such that the shunting members may be inserted directly into the deflection field produced by the yoke. Therefore, a change in position of one of the shunting members will produce a greater flux diversion than a corresponding movement of one of the shunting members 41 of Figure 2. Therefore, it is desirable to provide a finer degree of control in this form of the shunting structure. This result is achieved by making the cross section of the shunting members 41a so that it is non-uniform throughout its length. One way of achieving this result is by tapering the shunting members substantially in the manner shown.

From the foregoing description of a number of illustrative embodiments of the invention, it may be seen that there is provided an improved field distribution control apparatus by which a desired raster produced by means of an electron beam deflected by such a deflection field may be accurately controlled. The field distribution control apparatus also may be quite simple structurally and also is of a character to be easily adjusted. Not only may the deflection field distribution be controlled with a comparatively high degree of precision so as to produce the desired shape of the scanned raster, but also the field distribution control apparatus is of a character to enable the orientation of the entire raster substantially as desired.

The nature of the invention may be ascertained from the foregoing description of a number of illustrative embodiments thereof. The scope of the invention is pointed out in the appended claims.

What is claimed is:

1. In an electron beam deflection system, an electromagnetic yoke mounted adjacent to the path of said beam and energizable to deflect said beam to scan a raster, and means including a plurality of magnetic shunting members mounted adjacent to the beam-entrance end of said yoke and adjustably positionable in such a manner as to selectively control the shape of said scanned raster.

2. In an electron beam deflection system, an electromagnetic yoke mounted to substantially surround the path of said beam and energizable to produce a beam deflection field by which to cause said beam to scan a raster, and field-controlling means including a magnetic shunt mounted adjacent to the beam-entrance end of said yoke and comprising a plurality of relatively high permeability magnetic shunting members circumferentially spaced about said beam path and adjustably positionable so as to selectively control said deflection field and thereby the shape of said scanned raster.

3. An electron beam deflection system as defined in claim 2 wherein, said magnetic shunting members are mounted in a manner to be individually adjustable.

4. An electron beam deflection system as defined in claim 3 wherein, the mounting of said magnetic shunting members is such that they are adjustable longitudinally of said beam path.

5. An electron beam deflection system as defined in claim 2 wherein, said magnetic shunting members are mounted so as to be adjustable as a group.

6. An electron beam deflection system as defined in claim 5 wherein, said magnetic shunting members are adjustable circumferentially of said beam path.

7. An electron beam deflection system as defined in claim 2 wherein, said magnetic shunting members are mounted in a manner to be adjustable both longitudinally and circumferentially of said beam path.

8. In an electron beam deflection system, an electromagnetic yoke mounted to substantially surround the path of said beam and energizable to produce a beam deflection field by which to cause said beam to scan a raster, and field-controlling means including a magnetic shunt mounted adjacent to the beam-entrance end of said yoke, said magnetic shunt including a substantially annular support of non-magnetic material mounted to substantially surround the path of said beam in a region adjacent to said yoke and a plurality of relatively high permeability magnetic shunting members mounted in said support at circumferentially spaced points about said beam path and adjustably positioned in said support in such a manner as to selectively control said deflection field and thereby the shape of said scanned raster.

9. An electron beam deflection system as defined in claim 8 wherein, said shunting members are individually movable into and out of said support longitudinally of said beam path.

10. An electron beam deflection system as defined in claim 9 wherein, said shunting members are provided with clamping facilities by which they are secured in their adjusted positions.

11. An electron beam deflection system as defined in claim 10 wherein, said shunting members have substantially uniform cross sections throughout their respective lengths.

12. An electron beam deflection system as defined in claim 11 wherein, said support is movable circumferentially about said path.

13. An electron beam deflection system as defined in claim 12 wherein, said support also is movable longitudinally of said beam path.

14. In an electron beam deflection system, an electromagnetic yoke mounted to substantially surround the path of said beam and energizable to produce a beam deflection field by which to cause said beam to scan a raster, and field-controlling means including a magnetic shunt mounted adjacent to the beam-entrance end of said yoke and comprising a plurality of relatively high permeability magnetic shunting members circumferentially spaced about said beam path within said beam-entrance end of said yoke and adjustably positionable to selectively control the flux distribution of said deflection field and thereby the shape of said scanned raster.

15. An electron beam deflection system as defined in claim 14 wherein, said shunting members are movable longitudinally of said beam path.

16. An electron beam deflection system as defined in claim 14 wherein, said shunting members have cross sections which taper along the respective lengths thereof.

References Cited in the file of this patent

UNITED STATES PATENTS

| | | |
|---|---|---|
| 2,157,182 | Maloff | May 9, 1939 |
| 2,372,443 | Marton | Mar. 27, 1945 |
| 2,431,077 | Poch | Nov. 18, 1947 |
| 2,455,676 | Hillier | Dec. 7, 1948 |
| 2,494,459 | Torsch | Jan. 10, 1950 |